United States Patent [19]

Birchall et al.

[11] 4,410,366

[45] Oct. 18, 1983

[54] CEMENT COMPOSITION AND PRODUCT

[75] Inventors: James D. Birchall, Mouldsworth; Anthony J. Howard, Warrington; Kevin Kendall; James H. Raistrick, both of Runcorn, all of England

[73] Assignee: Imperial Chemical Industries PLC, London, England

[21] Appl. No.: 330,585

[22] Filed: Dec. 14, 1981

[30] Foreign Application Priority Data

Dec. 22, 1980 [GB] United Kingdom ................ 8041640
Jul. 27, 1981 [GB] United Kingdom ................ 8123103

[51] Int. Cl.$^3$ ............................................. C04B 7/35
[52] U.S. Cl. ...................................... 106/90; 106/104; 106/314
[58] Field of Search .................... 106/90, 314, 104

[56] References Cited

U.S. PATENT DOCUMENTS 4,229,224 10/1980 Dawson et al. .................... 106/90

FOREIGN PATENT DOCUMENTS 865199 3/1971 Canada ................................. 106/90
827917 1/1952 Fed. Rep. of Germany ........ 106/90
1563190 3/1980 United Kingdom ................. 106/90

*Primary Examiner*—James Poer
*Attorney, Agent, or Firm*—Cushman, Darby & Cushman

[57] ABSTRACT

A cementitious composition comprising hydraulic cement, not more than 25% of water by weight of the composition, and water soluble or dispersible (co)polymer in a proportion of 1 to 15% by weight of the hydraulic cement in the composition, the cement and (co)polymer being selected such that a test composition comprising 100 parts by weight of cement, 5 parts by weight of (co)polymer, and 16 parts by weight of water when extruded in a capillary rheometer undergoes an increase of at least 25% in shear stress when a ten-fold increase in the shear rate of the test composition from the capillary of the rheometer is effected. Also a cementitious product produced by setting of the composition. The (co)polymer is preferably a partially hydrolyzed poly (vinyl acetate). The cementitious product may have a flexural strength in excess of 100 MPa.

19 Claims, 1 Drawing Figure

CEMENT COMPOSITION AND PRODUCT

BACKGROUND OF THE INVENTION

This invention relates to a cementitious composition comprising a hydraulic cement and water and to a cementitious product produced by setting of the cementitious composition, and in particular it relates to a cementitious product having a high strength.

Cementitious products made by setting of a cementitious composition comprising a hydraulic cement and water are generally of low strength, and in particular generally have a low flexural strength as measured, for example, by the three-point bend flexural strength test. For many applications, and in particular where such products must withstand high flexural loads, it is desirable that the flexural strengths of such products be increased. A known method of improving the flexural strength of a cementitious product is to add fibrous material to the cementitious composition from which the product is produced. For example, it is known to increase the flexural strengths of cementitious products from a value of aproximately 5 MPa to a value of approximately 40 MPa by addition of fibrous material to the cementitious composition, as described by D. J. Hannant, Fibre Cements and Concretes (Wiley, London 1978). Fibrous materials which are used to increase the flexural strengths of cementitious products include asbestos, glass, steel, ceramic, polymer and vegetable fibrous materials.

The use of fibrous material however suffers from certain disadvantages. Thus, only relatively low flexural strengths can be achieved in the cementitious products, the flexural strengths rarely exceeding 40 MPa, the presence of the fibrous material in the cementitious composition may adversely affect the rheology of the composition making the composition more difficult to shape into a desired form, the fibrous material may lead to an anisotropic improvement in the flexural strength of the cementitious product, and the fibrous material may be toxic and may be associated with handling difficulties, as in the case of asbestos.

Cementitious products of high strength, and in particular of high flexural strength, are described in European Patent Application No. 80301909.0 in the name of Imperial Chemical Industries Limited, now published as publication No. 0 021 682. In this application there is described a cementitious product produced by setting of a composition comprising a mixture of a hydraulic cement and water not more than 2% of the total volume of the product comprising pores having a maximum dimension exceeding 100 microns, preferably 50 microns, and more preferably 15 microns. Cementitious products which satisfy the aforementioned porosity criteria are of high strength, particularly high flexural strength, and in general the flexural strengths of the products are in excess of 50 MPa. In general, the lower is the proportion of the total volume of the cementitious product comprising pores having a maximum dimension exceeding 100 microns, preferably 50 microns, more preferably 15 microns, the greater is the strength of the cementitious product, and for this reason it is preferred that not more than 0.5% of the total volume of the cementitious product comprises pores of maximum dimension exceeding 15 microns.

We have now found that a high strength cementitious product, particularly a cementitious product with high flexural strength, generally in excess of 40 MPa, may be produced by setting of a cementitious composition without the necessity of using fibrous material in the composition, and furthermore that the product may contain a proportion of pores of size in excess of 100 microns which exceeds the limit of 2% by volume specified in the aforementioned European Patent Publication No. 0 021 682.

However, where the cementitious product produced by setting of the cementitious composition does possess the aforementioned porosity criteria the flexural strength of the product may be greater than, and may even be considerably greater than, the flexural strengths of the products described in the aforementioned publication.

DETAILED DESCRIPTION OF THE INVENTION

Figure 1:
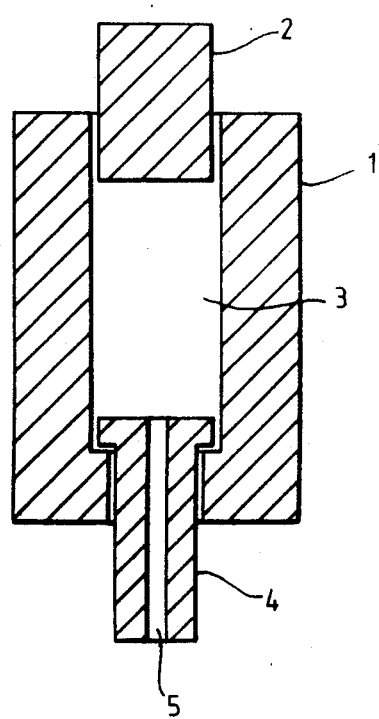
FIG. 1 illustrates in cross-section a capillary rheometer used in the capillary rheometer test described below the results of which are reported at Table 1.

According to the present invention there is provided a cementitious composition comprising
  (a) at least one hydraulic cement,
  (b) water in a proportion of not more than 25% by weight of the composition, and
  (c) at least one water-soluble or water-dispersible organic polymer or copolymer in a proportion of 1 to 15% by weight of the hydraulic cement in the composition,
the hydraulic cement and the polymer or copolymer being selected such that a test composition comprising 100 parts by weight of hydraulic cement, 5 parts by weight of the polymer or copolymer, and 16 parts by weight of water when extruded in a capillary rheometer undergoes an increase of at least 25% in shear stress when a ten-fold increase in the shear rate of the cementitious composition is effected when the shear rates as measured are within the range 0.1 to 5 second$^{-1}$.

A capillary rheometer in which the test composition is extruded comprises a piston in a cylindrical barrel and a capillary orifice through which the test composition may be extruded.

The shear stress in kN cm$^{-2}$ is defined by $(Fd)/(\pi LD^2)$ and the shear rate in second$^{-1}$ by $(2vD^2)/(15d^3)$ where D is the diameter of the barrel of the rheometer in cm, v is the rate of travel of the piston in the barrel of the rheometer in cm min$^{-1}$, d is the diameter of the capillary of the rheometer in cm, L is the length of the capillary of the rheometer in cm, and F is the force in kN applied to the piston of the rheometer. In general, D will be in the range 1 to 3 cm, d in the range 0.2 to 0.5 cm, and L in the range 5d to 20d.

By application of the capillary rheometer test the nature of the components for use in the cementitious composition of the invention may be selected. In particular, application of the capillary rheometer test enables hydraulic cements and water-soluble or water-dispersible organic polymers or copolymers to be readily selected which in combination are suitable for use in the cementitious composition of the invention.

A cementitious product produced by setting of a cementitious composition comprising hydraulic cement, not more than 25% by weight of water, and 1 to 15% by weight of water-soluble or water-dispersible organic polymer or copolymer by weight of the hydraulic cement will be of higher flexural strength where the hydraulic cement in combination with the polymer or copolymer are selected so that the test composition satisfies the aforementioned criteria of the capillary rheometer test than is the case where the hydraulic cement and the polymer or copolymer selected are such that the test composition does not satisfy the aforementioned criteria.

The organic polymer or copolymer in the cementitious composition of the invention, hereinafter generally referred to as the polymer, should be water-soluble or water dispersible. Whilst it may be difficult to judge whether or not a polymer is truly water-soluble or is merely partially solvated by water and is capable of being well dispersed in water, the polymer present in the cementitious composition of the invention should be sufficiently soluble in or be sufficiently well dispersed in the water in the composition to be effective as a rheological aid in the processing of the cementitious composition. Thus, the polymer should be sufficiently water-soluble or water-dispersible and be present in the cementitious composition of the invention in a proportion such that the composition is capable of being formed into a plastic dough when compounded in conventional mixing equipment, for example when compounded in a Brabender Plastograph, when extruded, or when compounded on a twin roll mill. For example, if the polymer is sufficiently water-soluble or water-dispersible the composition will be sufficiently cohesive that it may be formed into a continuous, cohesive, plastic sheet on a twin roll mill. The sheet is preferably sufficiently cohesive that it may be removed from the rolls in lengths of at least 30 cm. If the polymer is not sufficiently water-soluble or water-dispersible a continuous, cohesive, plastic sheet will not be formed. Indeed the mixture may be friable. It is preferred to use a water-soluble polymer as such polymers are generally particularly effective as rheological aids.

When the capillary rheometer test is applied to many compositions comprising a hydraulic cement, water, and a water-soluble or water-dispersible organic polymer or copolymer, e.g. polyacrylamide, polyvinyl pyrollidone, polyethylene oxide, or hydroxypropyl methyl cellulose, in the proportions hereinbefore specified for use in the test composition it is found that the compositions undergo little or no increase in shear stress in response to a substantial increase in shear rate, or may even show a decrease in shear stress. Indeed the shear stress is often virtually independent of shear rate. Compositions containing such combinations of hydraulic cement and water-soluble or water-dispersible organic polymer or copolymer do not form part of the present invention. The components of the cementitious composition of this invention are selected such that in the capillary rheometer test the test composition undergoes an increase of at least 25%, and preferably at least 50%, in shear stress when a ten-fold increase in the shear rate of the composition is effected. In general, the greater is the change in shear stress observed when the shear rate is increased ten-fold the greater will be the flexural strength of the cementitious product produced from the cementitious composition of the invention.

The test composition for use in the capillary rheometer test should of course be thoroughly mixed and be sufficiently fluid that it is capable of being extruded in the capillary rheometer, and for this reason it is preferred to carry out the test shortly after preparation of the test composition and before substantial setting of the composition has taken place. Thus, the test will generally be effected in the time period up to 30 minutes, preferably 5 to 15 minutes, after contacting the hydraulic cement with the water in the formulation of the test composition and it is desirable to effect the ten-fold change in shear rate at most a short time after the shear stress at the first shear rate has been measured. As elevated temperatures may accelerate setting of the test composition is also preferred to effect the test at or near ambient temperature, e.g. at or near 20° C. The dimensions of the capillary rheometer, and particularly the dimensions of the capillary, should be selected so that the test composition can be extruded at a rate in the desired range of 0.1 to 5 second$^{-1}$. Such selection can be made by means of simple test.

A particularly suitable polymer for use in the cementitious composition of the invention is hydrolysed vinyl acetate polymer or copolymer. The polymer may be a copolymer of vinyl acetate and a monomer copolymerisable therewith, but it is preferably a hydrolysed poly(-vinyl acetate).

The degree of hydrolysis of the vinyl acetate (co)polymer has a bearing on whether or not the (co) polymer in combination with a hydraulic cement in the test composition satisfies the aforementioned criteria of the capillary rheometer test. In order that in the capillary rheometer test an increase of at least 25% in shear stress should be produced by the ten-fold increase in shear rate, it is preferred that the degree of hydrolysis of the vinyl acetate (co)polymer be at least 50%, and more preferably in the range 70% to 90%, that is, it is preferred that at least 50%, and more preferably 70% to 90% of the vinyl acetate units in the polymer or copolymer are hydrolysed to the alcohol form. We have found that a test composition containing substantially fully hydrolysed vinyl acetate (co) polymer, e.g. more than 97% hydrolysed, does not satisfy the criteria of the capillary rheometer test. Indeed it is very difficult to produce a test composition which is extrudable in the capillary rheometer.

For a given proportion of hydrolysed vinyl acetate (co)polymer in the cementitious composition of the invention the properties of the cementitious product produced therefrom are relatively insensitive to variations in the molecular weight of the hydrolysed vinyl acetate (co)polymer. In general, however, the molecular weight of the hydrolysed vinyl acetate (co)polymer wil be at least 3000, e.g in the range 5000 to 125,000.

In order that the presence of the (co) polymer should have a significantly beneficial effect on the flexural strength of the cementitious product the cementitious composition of the invention contains at least 1% of (co) polymer by weight of the hydraulic cement in the composition, and preferably at least 3% by weight.

The cementitious composition may contain two or more different (co) polymers.

By the term "hydraulic cement" we mean a material which sets and hardens by the addition of water, and which thus sets and hardens in the presence of water. The hydraulic cement may be an aluminous cement, by which we mean a cement containing a high proportion of equivalent alumina, generally an amount of equivalent alumina in excess of 30% by weight of the hydraulic cement. The cement may contain alumina per se, or it may contain an aluminate, or both. Suitable alumina cements include those based on calcium aluminates, for example Ciment Fondu, Secar 50, Secar 71 and Secar 80. Mixtures of two or more different aluminous hydraulic cements may be used.

The use of aluminous cement in combination with hydrolysed poly(vinyl acetate) of the type hereinbefore described in the cementitious composition of the invention is preferred as a test composition containing such a polymer and cement combination undergoes a substantial increase in sher stress when a ten-fold increase in shear rate is effected. Cementitious products produced from such cementitious compositions of the invention have very high flexural strengths, even as high as 150 MPa or greater.

Another suitable cementitious composition of the invention which, in the form of the test composition satisfies the criteria of the capillary rheometer test, comprises a calcium silicate cement of the Portland type and hydrolysed poly(vinyl acetate) of the type hereinbefore described.

The hydraulic cement may have a conventional particle size distribution. For example, the particle size may be from sub-micron up to 150 microns.

The proportion of water in the cementitious composition of the invention has a bearing on the properties of the cementitious product produced therefrom, and for high flexural strength products to be obtained it is desirable to use in the composition the minimum amount of water which enables a plastic dough-like shapeable cementitious composition to be achieved. The proportion of water in the cementitious composition should not be more than 25% by weight of the composition, and it is preferably not more than 18% and more preferably not more than 12% by weight of the composition, although the amount of water should not be so low that a plastic dough-like shapeable cementitious composition cannot be formed.

The cementitious composition of the invention may be produced merely by mixing the appropriate components, that is, hydraulic cement, water, and polymer. Alternatively, the hydraulic cement may be mixed with an aqueous solution or dispersion of the polymer. The composition should be thoroughly mixed to form a homogeneous composition, and is preferably subjected to a high shearing action. Thorough mixing under vacuum may be effected if desired.

The high shearing action may be achieved by compounding the composition in a bladed high shear mixer and/or on a twin roll mill, the composition being passed repeatedly through the nip between the rolls of the mill. A bladed high shear mixer may be used to effect initial mixing of the composition and the composition may subsequently be mixed and sheared on a twin-roll mill.

The cementitious composition of the invention may be shaped, for example, by extrusion or by compressing in a mould. Thus, the composition may be extruded through a suitably shaped orifice into the form of a rod or tube, or it may be extruded into the form of a sheet. However, the advantageous properties of the cementitious product are not dependent on the use of high pressure in the shaping of the composition, use of a pressure of 1 to 5 MPa generally being sufficient.

The setting of the cementitious composition of the invention may be achieved in conventional manner, for example, by maintaining the composition in a humid atmosphere, e.g at a relative humidity at or near 100% for a period of 0.5 to 30 days, or setting may be achieved merely by allowing the composition to stand at ambient temperature and relative humidity. The time required to achieve setting is dependent at least in part on the temperature used, the higher the temperature the shorter the setting time required. Although setting may be effected at ambient temperature the time required may conveniently be reduced by using a setting temperature in the range, for example, 40° C. to 120° C.

The cementitious composition may be set at elevated temperature and under a moderate applied pressure, e.g of up to 5 MPa. It is preferred to set the composition under such an applied moderate pressure, at least in the initial stages of the setting reaction.

The invention also provides a cementitious product produced by setting of a cementitious composition of the invention comprising at least one hydraulic cement, water, and at least one water-soluble or water-dispersible organic polymer or copolymer as hereinbefore described.

The cementitious product comprises 1% to 15% of organic polymer or copolymer by weight of the hydraulic cement in the product, and preferably at least 3% of organic polymer or copolymer.

Although, where high flexural strength is desired, it is not necessary that the cementitious product possesses the aforementioned porosity criteria it is preferred, where a particularly high flexural strength is desired, that the product does satisfy these criteria. Indeed, where the cementitious product satisfies the aforementioned porosity criteria we have been able to produce cementitious products having flexural strengths as great as 100 MPa, and even as high as 150 MPa or greater. Thus, it is preferred that not more than 2%, and more preferably not more than 0.5%, of the total volume of the cementitious product comprises pores having a maximum dimension exceeding 100 microns, preferably 50 microns, and more preferably 15 microns, as measured by the method of quantitative microscopy described in the published European Patent Publication No. 0 021 682.

The production of such a preferred cementitious product is assisted by application of high shear during mixing of the composition and by setting of the composition under a moderate applied pressure as described.

Quantitative microscopy is a technique well known in the art. A surface of a sample of the cementitious product is polished to produce a plane surface on the sample, the sample is washed to remove the polishing debris from the surface, and the surface is illuminated to ensure that the holes in the surface are contrasted with the plane parts of the surface, and the surface is viewed by means of an optical microscope, typically at a magnification of ×100, and the holes exceeding 100 microns, or 50 microns or 15 microns in size, are determined, as described in "Quantitative Microscopy" by De Hoff and Rhines, McGraw Hill 1968. Sufficient area of the surface of the sample should be viewed to reduce the statistical error, and usually 1000 holes are counted. The sample is then subjected to further polishing in order to expose another surface and the optical examination is repeated. In general ten such surfaces are examined.

Although the achievement of high flexural strength in the cementitious product is not dependent on the use of fibrous material in the cementitious composition from which the product is produced such materials may be used. Suitable fibrous materials include asbestos, glass, steel, ceramic, polymer and vegetable fibrous materials. The amount of fibrous material used may be such as to result in a cementitious product containing, for example, 0.1% to 30% of fibrous material by weight of the fibre-containing cementitious product. The composition and product may also contain finely divided particulate organic polymeric material, eg rubber.

It is also preferred, for additional improvements in flexural strength, that the total volume of pores in the cementitious product, as measured by mesitylene sorption, expressed as a proportion of the apparent volume of the product, including the pores, does not exceed 20%. Porosities not exceeding 15%, and even porosities not exceeding 10% are more preferred. Indeed, we have found that the total volume of pores in the cementitious product of the invention produced from a composition containing the preferred organic polymer or copolymer is unexpectedly low and may be less than 3% of the apparent volume of the product, including pores, or even less than 1%. In a further embodiment of the present invention we provide a cementitious product produced by setting of a cementitious composition comprising at least one hydraulic cement, water, and at least one water-soluble or water-dispersible organic polymer or copolymer as hereinbefore described, the cementitious product comprising a proportion of pores which is not more than 3%, and preferably not more than 1% of the apparent volume of the product, including pores.

The strength of the cementitious product, and in particular the flexural strength, in general increases with decrease in the proportion of pores in the product having a size in the range 2 to 15 microns, and it is preferred that the product contains less than 5%, more preferably less than 2%, of the apparent volume of the product of pores having a size in the range 2 to 15 microns.

The cementitious composition of the invention may contain components other than those hereinbefore described. For example, in addition to the water-soluble or water-dispersible organic polymer or copolymer which enables the test composition to satisfy the capillary rheometer test the composition may contain other materials which aid the processing of the composition. Such materials may be:

(a) a polymer having a lubricating action on the cement particles, and/or (b) an additive having a dispersing action on the particles, for example a surfactant, or a mixture of such additives.

The composition must, however, contain at least one water-soluble or water-dispersible organic polymer or copolymer as hereinbefore described.

Examples of such other additives/polymers include:

(a) cellulose ethers, for example hydroxypropyl methyl cellulose, (b) amide-substituted polymers, for example a polymer or copolymer of acrylamide, (c) polyalkylene oxide derivatives which may be for example a polyalkylene oxide (alternatively described as a polyalkylene glycol) for example polyalkylene glycols of molecular weight above about 10,000, or polyalkoxy derivatives or alcohols, phenols, or the like, (d) sulphonated materials of the kind known in the art for imparting plasticising properties, for example lignosulphonates and sulphonated naphthalene salts.

A high boiling polyol, for example glycerol, an alkylene glycol or a polyalkylene glycol, may be included in the cementitious composition of the invention. We have observed that such a polyol assists in maintaining high flexural strength in the cementitious product, particularly when the latter is produced by setting at elevated temperature.

The cementitious composition of the invention, and the cementitious product produced therefrom, may contain particulate aggregate, e.g sand, silicon carbide, alumina. The aggregate is preferably of small particle size, e.g. less than 200 microns. Where the composition and product contain such particulate aggregate the proportions of polymer or copolymer referred to herein, for example 1% to 15%, refer to the proportions of polymer or copolymer by weight of hydraulic cement plus particulate aggregate in the composition or product. Furthermore, the capillary rheometer test should be performed on a composition comprising hydraulic cement plus particulate aggregate (in total 100 parts by weight), 5 parts by weight of polymer or copolymer, and 16 parts by weight of water.

The cementitious products of the invention may be used in applications in which cementitious products are conventionally used, for example as sheets, pipes, tubes, and electrical insulators. The improved flexural properties of the cementitious product enable it to be used as a replacement for other materials, e.g. plastics and metals.

Specific embodiments of the invention of the present application will now be described with the aid of the following examples in which, unless otherwise stated, all parts are parts by weight.

Initially there is described the application of the aforementioned capillary rheometer test to a number of test compositions comprising hydraulic cement and water-soluble or water-dispersible organic polymer or copolymer.

A test composition comprising
100 parts of hydraulic cement
5 parts of water-soluble or water-dispersible organic polymer or copolymer, and
16 parts of water
was thoroughly mixed in a bladed high shear mixer and the composition was then passed repeatedly through the nip of a twin-roll mill to form a sheet of a plastic-like dough.

The dough was then charged, within 10 minutes of the completion of mixing, to a capillary rheometer of the type illustrated in FIG. 1.

The rheometer comprises a cylindrical barrel 1 having an internal diameter 1.3 cm and a piston 2 positioned in the cylinder 3 of the barrel. The lower end of the barrel carries a die 4 having a capillary 5 of diameter 0.45 cm and length 4.4 cm.

The test composition in the rheometer was then extruded through the die at a constant shear rate of 0.247 sec$^{-1}$ and the force required to extrude at this shear rate was recorded. The shear rate was then immediately increased tenfold to 2.47 sec$^{-1}$ and the force required to extrude at this new shear rate was recorded. The shear stresses were then calculated from the extrusion forces at each of the two shear rates using the formula hereinbefore described. The change in shear stress for this tenfold increase of shear rate was then calculated.

In the following table, Table 1, the results are given of the application of the capillary rheometer test to a number of test compositions comprising hydraulic cement and water-soluble or water-dispersible organic polymer or copolymer.

In the table the viscosities quoted in centipoise (cps) were determined on a 4% by weight aqueous solution of the polymer or copolymer at 20° C., and the hydrolysis quoted, in respect of hydrolysed poly(vinyl acetate), refers to the percentage of the acetate groups which have been hydrolysed.

TABLE 1

| Test | Cement Type | Trade Name | Polymer or Copolymer type | Trade Name | Shear Stress KNcm$^{-2}$ at; Shear rate 0.247 sec$^{-1}$ | Shear rate 2.47 sec$^{-1}$ | % change in shear stress $\frac{y-x}{0.863Z} \times 100\%$ |
|---|---|---|---|---|---|---|---|
| A | Calcium aluminate | Secar 71 (Lafarge) | Hydrolysed poly(vinyl acetate) Hydrolysis 80% Viscosity 35 cps | Gohsenol KH 17S (Nippon Gohsei) | 0.00674 | 0.01348 | +100% |
| B | Calcium aluminate | Secar 71 (Lafarge) | Hydrolysed poly(vinyl acetate) Hydrolysis 82% Viscosity 18 cps | Polyviol 25.240 (Wacker Chemie) | 0.00551 | 0.0111 | +102% |
| C | High alumina | Ciment Fondu (Lafarge) | Hydrolysed poly(vinyl acetate) Hydrolysis 80% Viscosity 35 cps | Gohsenol KH 17S (Nippon Gohsei) | 0.00424 | 0.00867 | +105% |
| D | Calcium aluminate | Secar 71 (Lafarge) | Hydrolysed poly(vinyl acetate) Hydrolysis 88% Viscosity 30 cps | Gohsenol GH 17S (Nippon Gohsei) | 0.00963 | 0.017 | +76% |
| E | Calcium silicate (White Portland) | Snowcrete (Blue Circle) | Hydrolysed poly(vinyl acetate) Hydrolysis 80% Viscosity 35 cps | Gohsenol KH 17S (Nippon Gohsei) | 0.0164 | 0.0222 | +35% |
| F | Calcium silicate | Snowcrete (Blue Circle) | Hydroxy propyl methyl cellulose | Celacol HPM 15000 DS | 0.0289 | 0.0222 | −23% |
| G | Calcium aluminate | Secar 71 (Lafarge) | Hydroxy propyl methyl cellulose | Celacol HPM 15000DS | 0.0738 | 0.0587 | −20.5% |
| H | Calcium aluminate | Secar 71 (Lafarge) | poly(acrylamide) | Cyanamer P250 | 0.0389 | 0.0395 | +1.5% |
| I | Calcium aluminate | Secar 71 (Lafarge) | Hydrolysed poly(vinyl acetate) Hydrolysis 99% Viscosity 30 cps | Gohsenol NH 17S (Nippon Gosei) | Could not be formed into plastic dough and could not be extruded in rheometer. | | |
| J | Calcium aluminate | Secar 71 (Lafarge) | Hydrolysed poly(vinyl acetate) Hydrolysis 50% | Polyviol W45/450 (Wacker Chemie) | Could not be formed into plastic dough and could not be extruded in rheometer. | | |

It can be seen from the table that test compositions comprising the hydraulic cement and polymer or copolymer of tests A to E pass the capillary rheometer test, and can thus be used to form cementitious compositions of the present invention, whereas the hydraulic cement and polymer or copolymer of the test compositions of Tests F to J do not pass the capillary rheometer test, and thus cannot be used to form cementitious compositions of the present invention.

In the following Examples the volume of pores having a maximum dimension greater than 15 microns expressed as a proportion of the volume of the cementitious product was measured by the method of quantitative microscopy hereinbefore described. The overall porosity of the cementitious product, that is the total volume of pores, expressed as a proportion of the apparent volume of the product, including pores, was measured by drying a sample of the cementitious product by heating for 16 hours in an oven at 110° C., allowing the sample to cool in a dessicator, weighing the sample (x.g), and measuring the dimensions of the sample from which the volume Z cm$^3$ was determined. The sample was then immersed in mesitylene for 3 days at 20° C., the sample was removed from the mesitylene, and the surface liquid was removed by wiping with a tissue, and the sample was reweighed. The steps of immersing in mesitylene for 3 days, wiping and weighing were then repeated until the sample reached a constant weight (y.g).

The percentage of porosity by volume of the sample was calculated from the formula The flexural strengths of the cementitious products were measured on strips which were cut with a diamond-tipped saw from sheets. The strips were subjected to a 3-point bend test on an Instron machine.

The flexural strength of the strips were calculated using the following formula:

$$\text{Flexural Strength} = \frac{WL}{d^2w} \times 0.1471 \text{ MPa}$$

where
W = load at failure (in Kg)
L = span (in cm)
d = depth (in cm)
w = width (in cm)

DESCRIPTION OF THE PREFERRED EMBODIMENTS

In the following Examples the production of cementitious compositions, and cementitious products, of the invention is shown.

EXAMPLE 1

100 parts of a calcium aluminate cement (Secar 71) and 7 parts of a hydrolysed poly(vinyl acetate) of the type used in Test A above were dry mixed and the resultant mixture was added to 11.5 parts of water containing 0.7 part of glycerol. The resultant composition was blended in a bladed high shear mixer and was then removed from the mixer in the form of a crumble and converted into a cohesive, continuous and homogeneous sheet form by passing the composition repeatedly through the nip of a twin-roll mill.

The sheet was then lightly pressed for 10 minutes between sheets of poly(ethylene terephthalate) in a hydraulic press at a temperature of 80° C. and at an applied pressure of 3 MPa. The 3 mm thick sheet was then removed from the press, the sheets of poly(ethylene terephthalate) were removed, and the sheet was dried by standing at 20° C. for 24 hours and heating at 80° C. for 15 hours.

The cementitious sheet had the following properties

| Flexural strength | 168 MPa |
|---|---|
| Porosity | <0.5% |
| Pores (>15 microns) | <0.1% |

By way of comparison the above procedure was repeated with a composition of

| Calcium aluminate cement (Secar 71) | 100 parts |
|---|---|
| Hydroxypropyl methyl cellulose of the type used in Test G | 5 parts |
| Water | 14 parts | except that the composition was pressed for 16 hours in a hydraulic press at 20° C. before drying at 20° C. for 24 hours and 80° C. for 15 hours.

The cementitious sheet which was produced had the following properties,

| Flexural strength | 58 MPa |
|---|---|
| Porosity | 17.2% |
| Pores (>15 microns) | >0.2% |

EXAMPLE 2

The procedure of Example 1 was repeated with a composition of

| High alumina cement (Ciment Fondu) | 100 parts |
|---|---|
| Hydrolysed poly(vinyl acetate) of the type used in Test C | 7 parts |
| Water | 11 parts |
| Glycerol | 0.7 part |

The cementitious sheet which was produced had the following properties

| Flexural strength | 165.5 MPa |
|---|---|
| Porosity | <0.5% |
| Pores (>15 microns) | <0.2% |

By way of comparison the procedure of Example 1 was repeated on a composition comprising

| Calcium aluminate cement (Secar 71) | 100 parts |
|---|---|
| Polyacrylamide of the type used in Test H | 7 parts |
| Water | 14 parts | with the exception that pressing at 80° C. was effected for 20 minutes and thereafter the sheet was dried at 20° C. for 7 days.

The cementitious sheet had the following properties.

| Flexural strength | 73.5 MPa |
|---|---|
| Porosity | 3.2% |
| Pores (>15 microns) | <0.2% |

EXAMPLE 3

The procedure of Example 1 was repeated with a composition of

| Calcium silicate cement (Snowcrete) | 100 parts |
|---|---|
| Hydrolysed poly(vinyl acetate) of the type used in Test E | 7 parts |
| Water | 13.3 parts |
| Glycerol | 0.7 part | with the exception that pressing in a hydraulic press was effected for 30 minutes and the step of drying at 20° C. for 24 hours was omitted.

The cementitious sheet which was produced had the following properties

| Flexural strength | 88 MPa |
|---|---|
| Porosity | 9.5% |
| Pores (>15 microns) | <0.2% |

By way of comparison the procedure of Example 1 was repeated with a composition of

| Calcium silicate cement (Snowcrete) | 100 parts |
|---|---|
| Hydroxypropyl methyl cellulose of the type used in Test F | 5 parts |
| Water | 14 parts |
| Glycerol | 0.5 part | with the exception that pressing on a hydraulic press was effected for 30 minutes.

The cementitious sheet which was produced had the following properties

| Flexural strength | 65 MPa |
|---|---|
| Porosity | 12.2% |
| Pores (>15 microns) | <0.3% |

EXAMPLES 4 TO 7

In each example the mixing and milling procedure of Example 1 was used. In Examples 4, 5, 6 and 7 the cementitious composition was

| Calcium aluminate cement (Secar 71) | 100 parts |
|---|---|
| Hydrolysed poly(vinyl acetate) of the type used in Test B | 5 parts |
| Water | 12 parts | except that in Example 5 the composition contained 11 parts of water. The curing conditions used were as follows.

EXAMPLE 4: Pressing into sheet form, pressure removed, standing at 20° C. for 38 days.

EXAMPLE 5: As for Example 4 but allowed to stand for 45 days.

EXAMPLE 6: Pressing into sheet in a hydraulic press at 20° C. and 3 MPa for 16 hours, then allowed to dry by standing at 20° C. for 38 days.

EXAMPLE 7: As for Example 6 but allowed to stand for 45 days.

The properties of the cementitious sheets were as given in Table 2.

TABLE 2

| Example | Flexural strength MPa | Pores (>15 microns) % |
|---|---|---|
| 4 | 68 | 5.9 |
| 5 | 61.8 | 16 |
| 6 | 120.5 | <0.1 |
| 7 | 139 | <0.1 |

By way of comparison the mixing and milling procedure of Example 1 and the curing procedure of Example 5 were repeated with a composition of

| | |
|---|---|
| Calcium aluminate cement (Secar 71) | 100 parts |
| Hydroxypropyl methyl cellulose of the type of Test F | 5 parts |
| Water | 16 parts |

The properties of the cementitious sheet were as follows

| | |
|---|---|
| Flexural Strength | 27 MPa |
| Pores (>15 microns) | 9.6% |

EXAMPLES 8 TO 16

In these examples 100 parts of calcium aluminate cement (Secar 71) and different proportions of hydrolysed poly(vinyl acetate) as used in test B, glycerol, and water as set out in Table 3 were blended in a bladed high shear mixture and converted into sheet form on a twin-roll mill following the procedure described in Example 1. The sheets were then pressed in a hydraulic press at a temperature of 80° C. and at an applied pressure of 5 MPa for 20 minutes and then dried by standing at 20° C. and 50% relative humidity for 18 days.

The flexural strengths and moduli of the sheets are given in Table 3.

TABLE 3

| Ex | Poly (vinyl acetate) parts | Water parts | Glycerol parts | Flexural strength MPa | Flexural Modulus GPa |
|---|---|---|---|---|---|
| 8 | 3 | 13 | 0.3 | 53 | 29.7 |
| 9 | 4 | 12 | 0.4 | 91 | 33.4 |
| 10 | 5 | 11 | 0.5 | 133 | 43.3 |
| 11 | 6 | 10 | 0.6 | 124 | 34 |
| 12 | 7 | 10 | 0.7 | 166 | 38.7 |
| 13 | 8 | 10 | 0.8 | 129 | 31.2 |
| 14 | 8.5 | 11 | 0.85 | 177 | 35.7 |
| 15 | 10 | 12 | 1.0 | 148 | 32.7 |
| 16 | 12 | 14 | 1.2 | 126 | 23.4 |

EXAMPLE 17

Following the procedure hereinbefore described a composition comprising

| | |
|---|---|
| calcium aluminate cement (Secar 71) | 50 parts |
| Sand (size < 180 micron) | 50 parts |
| Hydrolysed poly (vinyl acetate) (as used in Test A) | 5 parts |
| Water | 16 parts | was subjected to the capillary rheometer test with the following results

| Shear rate Sec$^{-1}$ | Shear stress KN cm$^{-2}$ |
|---|---|
| 0.247 | 0.00519 |
| 2.47 | 0.009908 |

The change in shear stress was 90.9%. The blending procedure of Example 1 was then followed to produce a sheet from a composition comprising

| | |
|---|---|
| Calcium aluminate cement (Secar 71) | 50 parts |
| Sand (size < 180 micron) | 50 parts |
| Hydrolysed poly (vinyl acetate) (as used in Test A) | 7 parts |
| Water | 8.8 parts |
| Glycerol | 0.7 parts | and the sheet was pressed in a hydraulic press at a temperature of 80° C. under an applied pressure of 3 MPa for 10 minutes, and the sheet was then dried at a temperature of 80° C. for 18 hours.

The sheet had the following properties:

| | |
|---|---|
| Flexural strength | 121.7 MPa |
| Flexural modulus | 47.8 GPa |
| Pores > 15 microns | Not detectable |
| Porosity | 0.7% |

EXAMPLE 18

Following the procedure hereinbefore described a composition comprising:

| | |
|---|---|
| Calcium aluminate cement (Secar 71) | 50 parts |
| Alumina (Aloxite MW) | 50 parts |
| Hydrolysed poly (vinyl acetate) (as used in Test A) | 5 parts |
| Water | 16 parts | was subjected to the capillary rheometer test with the following results:

| Shear rate Sec$^{-1}$ | Shear stress KN cm$^{-2}$ |
|---|---|
| 0.247 | 0.0057 |
| 2.47 | 0.0112 |

The change in shear stress was 96.5%. The blending procedure of Example 1 was then followed to produce a sheet from a composition comprising

| | |
|---|---|
| Calcium aluminate cement (Secar 71) | 50 parts |
| Alumina (Aloxite MW) | 50 parts |
| Hydrolysed poly (vinyl acetate) (as used in Test A) | 7 parts |

| | |
|---|---|
| Water | 8.3 parts |
| Glycerol | 0.7 parts | and the sheet was pressed in a hydraulic press at a temperature of 80° C. under an applied pressure of 3 MPa for 10 minutes, and the sheet was then dried at a temperature of 80° C. for 18 hours.

The sheet had the following properties:

| | |
|---|---|
| Flexural strength | 142 MPa |
| Flexural modulus | 64.5 GPa |
| Pores > 15 microns | <0.1% |
| Porosity | 0.3% |

EXAMPLE 19

Following the procedure hereinbefore described a composition comprising:

| | |
|---|---|
| Calcium aluminate cement (Secar 71) | 100 parts |
| Hyorolysed poly (vinyl acetate) (Wacker 30.240 Hydrolysis 77%. Molecular Weight 107000) | 5 parts |
| Water | 16 parts | was subjected to the capillary rheometer test with the following results:

| Shear rate sec$^{-1}$ | Shear stress KN cm$^{-2}$ |
|---|---|
| 0.247 | 0.00613 |
| 2.47 | 0.0121 |

The change in shear stress was 98%.

The blending procedure of Example 1 was then followed to produce a sheet from a composition comprising.

| | |
|---|---|
| Calcium aluminate cement (Secar 71) | 100 parts |
| Hydrolysed poly (vinyl acetate) as used above | 7 parts |
| Glycerol | 0.7 parts |
| Water | 9.8 parts | and the sheet was pressed and dried following the procedure described in Example 18.

The sheet had the following properties:

| | |
|---|---|
| Flexural strength | 116 MPa |
| Flexural modulus | 47.8 GPa |
| Pores > 15 microns | <0.2% |
| Porosity | 0.1% |

By way of comparison the above procedure was repeated in two separate experiments except that the polymer in the compositions was, respectively, hydrolysed poly(vinyl acetate) 99% hydrolysis, and hydrolysed poly(vinyl acetate) 46% hydrolysis. In both experiments it was found not to be possible to produce a composition which was sufficiently well mixed for use in the capillary rheometer test, nor could a cohesive sheet be produced on a twin-roll mill.

EXAMPLES 20 AND 21

Cementitious compositions were prepared from compositions comprising:

| | |
|---|---|
| Calcium aluminate cement (Secar 71) | 100 parts |
| Hydrolysed poly (vinyl acetate) (as used in Test A) | 5 parts |
| Water | 18 parts (in Example 20) and 24 parts (in Example 21) |

The compositions were blended by mixing the hydrolysed poly(vinyl acetate) and water in a Winkworth sigma-blade mixer under a vacuum of 73.5 cm of mercury, releasing the vacuum, charging the cement to the mixer, re-applying the vacuum, and mixing for a further 10 minutes. The resultant dough was removed from the mixer and hand-rolled into the form of a sheet, and the sheet was dried by standing at 20° C. and 50% relative humidity for 18 hours followed by heating at 80° C. for 18 hours.

The properties of the sheets were as follows:

| | Example 20 | Example 21 |
|---|---|---|
| Flexural strength MPa | 117 | 76 |
| Flexural modulus GPa | 38.5 | 28 |
| Pores > 15 micron | 0.6% | 0.7% |
| Porosity | 3.6% | 9.2% |

We claim:

1. A cementitious composition comprising
   (a) at least one hydraulic cement,
   (b) water in a proportion of not more than 25% by weight of the composition, and
   (c) at least one water-soluble or water-dispersible organic polymer or copolymer in a proportion of 1 to 15% by weight of the hydraulic cement in the composition, characterised in that the hydraulic cement and the polymer or copolymer are selected such that a test composition comprising 100 parts by weight of hydraulic cement, 5 parts by weight of the polymer or copolymer, and 16 parts by weight of water then extruded in a capillary rheometer undergoes an increase of at least 25% in shear stress when a ten-fold increase in the shear rate of the test composition is effected when the shear rates as measured are within the range 0.1 to 5 second$^{-1}$.

2. A cementitious composition as claimed in claim 1 characterised in that the hydraulic cement and polymer or copolymer are selected such that the test composition undergoes an increase of at least 50% in shear stress when a ten-fold increase in the shear rate of the test composition is effected.

3. A cementitious composition as claimed in claim 1 characterised in that the organic polymer or copolymer is hydrolysed vinyl acetate polymer or copolymer.

4. A cementitious composition as claimed in claim 3 characterised in that the organic polymer or copolymer is hydrolysed poly(vinyl acetate).

5. A cementitious composition as claimed in claim 3 or claim 4 characterised in that the degree of hydrolysis of the vinyl acetate polymer or copolymer is at least 50%.

6. A cementitious composition as claimed in claim 5 characterised in that the degree of hydrolysis is in the range 70% to 90%.

7. A cementitious composition as claimed in claim 1 characterised in that the composition contains at least 3% of organic polymer or copolymer by weight of the hydraulic cement in the composition.

8. A cementitious composition as claimed in claim 1 characterised in that the hydraulic cement is an aluminous cement or a calcium silicate cement.

9. A cementitious composition as claimed in claim 1 characterised in that the composition contains not more than 18% by weight of water.

10. A cementitious composition as claimed in claim 1 characterised in that the composition contains particulate aggregate and in that the hydraulic cement and the polymer or copolymer are selected such that a test composition comprising hydraulic cement plus particulate aggregate (in total 100 parts by weight), 5 parts by weight of the polymer or copolymer, and 16 parts by weight of water when extruded in a capillary rheometer undergoes an increase of at least 25% in shear stress when a ten-fold increase in the shear rate of the test composition is effected when the shear rates as measured are within the range 0.1 to 5 second$^{-1}$.

11. A cementitious product produced by setting of a cementitious composition as claimed in claim 1.

12. A cementitious product as claimed in claim 11 characterised in that not more than 2% of the total volume of the product comprises pores having a maximum dimension exceeding 100 microns.

13. A cementitious product as claimed in claim 12 characterised in that not more than 0.5% of the total volume of the product comprises pores having a maximum dimension exceeding 15 microns.

14. A cementitious product as claimed in claim 11 characterised in that the product comprises a proportion of pores which is not more than 3% of the apparent volume of the product.

15. A cementitious product as claimed in claim 14 characterised in that the product comprises a proportion of pores which is not more than 1% of the apparent volume of the product.

16. A cementitious product characterised in that said product has a flexural strength of at least 100 MPa.

17. A cementitious product as claimed in claim 16 characterised in that said product has a flexural strength of at least 150 MPa.

18. A cementitious product as claimed in claim 11 having a flexural strength of at least 100 MPa.

19. A cementitious product as claimed in claim 18 having a flexural strength of at least 150 MPa.

* * * * *